United States Patent Office 3,173,833
Patented Mar. 16, 1965

3,173,833
FUNGICIDES
Paul-Ernst Frohberger, Burscheid, Bezirk Dusseldorf, and Ewald Urbschat, Cologne-Mulheim, Germany, assignors to Farbenfabriken Bayer Aktiengesellschaft, Leverkusen, Germany, a corporation of Germany
No Drawing. Filed Oct. 24, 1961, Ser. No. 147,169
Claims priority, application Germany, Oct. 28, 1960,
F 32,433
8 Claims. (Cl. 167—22)

The present invention relates to and has as its object the control of fungus plant diseases with agents for seed dressing and/or the treatment of soil consisting of or containing mixtures of methylarsine sulfide (MAS) with tetramethylthiuram disulfide (TMTD), quinone-oxime-benzoyl-hydrazone (QOBH), p-dimethylamino-phenyl-diazo-sulfonic acid (or the salts thereof) (DAS), derivatives of DAS or organic Hg compounds.

The following compounds are to be regarded as derivatives of DAS and may be employed either in the form of free acids or of their metallic salts:

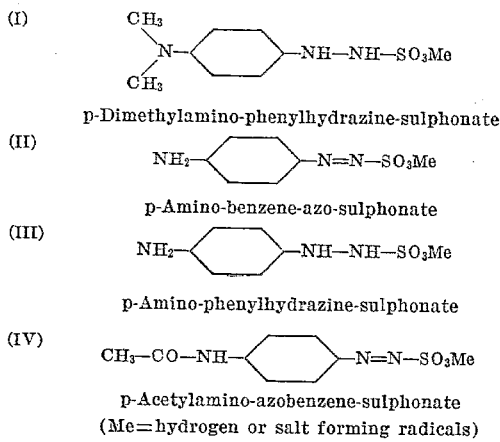

(I) p-Dimethylamino-phenylhydrazine-sulphonate (II) p-Amino-benzene-azo-sulphonate (III) p-Amino-phenylhydrazine-sulphonate (IV) $CH_3-CO-NH-\langle\ \rangle-N=N-SO_3Me$ p-Acetylamino-azobenzene-sulphonate (Me=hydrogen or salt forming radicals)

Ethylarsine sulfide (EAS) and, more particularly, methylarsine sulfide (MAS) are known to be extraordinarily efficient fungicides. When employed as dressing agent on cereals, MAS exhibits a wide spectrum of activity and is active against practically all the significant species of fungus whose organs of propagation adhere externally to the seed. This universal fungicidal potential, which is similar to that of organic Hg compounds, is not sufficiently expressed when MAS is employed as a dressing agent for seed or as an agent for soil treatment against soil fungi. In the latter case, its activity is limited to the fungi of the Rhizoctonia, Sclerotium, and Thielaviopsis species, the first of which is the more significant economically. Of the same economic importance, however, are other species of fungi such as, e.g. Pythium and Fusarium, which in the form of soil fungi cannot be controlled by MAS.

Since it is impossible to foresee the species of fungi which may develop in various cultivated plants on different soils under a variety of weather conditions, and which can cause diseases among seedlings and roots, the success of a control of fungis infection originating from the soil is doubtful by means of MAS.

It has now been found that this unreliability of MAS, when employed against soil fungi, can be overcome by combining it with other known fungicides such as TMTD, DAS, derivatives of DAS, QOBH, and organomercuric compounds. The mixed compositions combine the unsurpassed Rhizoctonia activity of MAS with the wider activity of the second component, and additionally exhibit a degree of activity which exceeds that due to the individual components. Such preparations can be considered for soil treatment as well as for seed treatment. An optimum activity is attained when the individual active agents are contained in it in the proportion of 1:100 to 2:1, the first proportional figure always relating to MAS.

These mixed compositions may, of course, contain inert materials, dressing agents and other plant protecting agents such as fungicides, insecticides, nematicides and agents for the improvement of soil structure and fertilisers, in addition to the specified agents. They may be formulated in the form of compositions to be scattered, dusted or sprayed, and may constitute granulates, powders, pastes, suspensions, emulsions, and genuine solutions.

The following examples are given for the purpose of illustrating the invention.

*Example 1*

Greenhouse growth test at temperatures of about 20° C.

Seed: Peas.
Soil: Fruhstorf standard soil, sterilised.
 (a) Non-inoculated
 (b) Inoculated with *Pythium ultimum*
 (c) Inoculated with *Rhizoctonia solani*
 (d) Inoculated with *Pythium ultimum* and *Rhizoctonia solani*

Application of the preparations as soil treatment agents.

| No. | Preparation | Concn. of agent in soil, as ppm. | Number of healthy plants, out of 100 peas, 3 weeks after sowing | | | |
|---|---|---|---|---|---|---|
| | | | a | b | c | d |
| 1 | Untreated | | 87 | 0 | 2 | 0 |
| 2 | MAS | 10 | 92 | 6 | 89 | 14 |
| 3 | DAS | 25 | 91 | 90 | 4 | 12 |
| 4 | TMTD | 100 | 88 | 32 | 64 | 38 |
| 5 | MAS + DAS | 5+10 | 90 | 91 | 88 | 90 |
| 6 | MAS + TMTD | 5+95 | 91 | 52 | 90 | 79 |

*Example 2*

Growth tests as in Example 1, except for the difference that the preparations were employed in the form of seed dressings. The quantity of dressing homogenously applied amounted to 2 g./kg. of seed.

| No. | Preparation | Concn. of agent in dressing, percent | Number of healthy plants, out of 100 peas, 3 weeks after sowing | | | |
|---|---|---|---|---|---|---|
| | | | a | b | c | d |
| 1 | Untreated | | 87 | 0 | 10 | 0 |
| 2 | MAS | 10 | 92 | 3 | 78 | 6 |
| 3 | QOBH | 5 | 90 | 91 | 14 | 17 |
| 4 | TMTD | 50 | 93 | 44 | 65 | 51 |
| 5 | MAS + QOBH | 7+3 | 91 | 93 | 77 | 79 |
| 6 | MAS + TMTD | 10+40 | 91 | 57 | 75 | 68 |

*Example 3*

Growth tests in greenhouse at temperatures of about 12° C.

Seed: Multigerm sugar beet seed strongly infected with *Phoma betae*.
Soil: Sterilised quartz sand.

Application of the preparations as seed dressings employed at a rate of 6 g./kg. of seed.

| No. | Preparation | Concn. of agent in dressing, percent | Number of healthy plants out of 100 clusters, 4 weeks after sowing |
|---|---|---|---|
| 1 | Not dressed | | 11 |
| 2 | MAS | 10 | 115 |
| 3 | QOBH | 5 | 30 |
| 4 | TMTD | 50 | 150 |
| 5 | PMCl (phenyl-Hg-chloride) | 3 | 103 |
| 6 | MAS + QOBH | 5+5 | 163 |
| 7 | MAS + TMTD | 5+45 | 167 |
| 8 | MAS + PMCl | 5+3 | 155 |

We claim:

1. A fungicidal composition containing tetramethyl thiuram disulfide and methyl arsine sulfide in a ratio by weight of about 95:5.

2. A fungicidal composition containing quinone-oxime-benzoyl-hydrazone and methyl arsine sulfide in a ratio by weight of about 3–5:5–7.

3. A fungicidal composition containing p-dimethyl-amino-phenyl diazo-sulfonic acid and methyl arsine sulfide in a ratio by weight of about 10:5.

4. A fungicidal composition containing sodium p-dimethyl-amino-phenyldiazo-sulfonate and methyl arsine sulfide in a ratio by weight of about 10:5.

5. A method for controlling mixed plant fungal infections involving *Pythium ultimum* with soil fungi sensitive to methyl arsine sulfide, comprising incorporating into soil an effective amount of a mixture selected from the group consisting of (a) tetramethylthiuram disulfide with methyl arsine sulfide at a ratio of about 95:5; and (b) p-dimethyl-amino phenyldiazo-sulfonate with methyl arsine sulfide at a ratio of about 10:5, the ratios being in parts by weight.

6. A method for protecting seeds against mixed fungal infection involving *Pythium ultimum* in combination with additional fungi comprising dressing seeds with a composition containing as active ingredient a mixture selected from the group consisting of (A) tetramethyl-thiuram disulfide with methyl arsine sulfide at a ratio of about 95:5; (B) tetramethyl-thiuram disulfide with methyl arsine sulfide at a ratio of 40:10; and (C) quinone-oxime-benzoyl-hydrazone with methyl arsine at a ratio of 3:7, the ratios being in parts by weight.

7. A fungicidal composition containing as active ingredient a mixture selected from the group consisting of:
   (A) tetramethyl thiuram disulfide and methyl arsine sulfide at a ratio of about 95:5;
   (B) tetramethyl thiuram disulfide and methyl arsine sulfide at a ratio of about 40:10;
   (C) quinone-oxime-benzoyl-hydrazone and methyl arsine sulfide at a ratio of about 3:7; and
   (D) p-dimethylamino-phenyl diazo-sulfonic acid and methyl arsine sulfide at a ratio of about 10:5,
the ratios being in parts by weight.

8. A fungicidal composition containing tetramethyl-thiuram disulfide and methyl arsine sulfide in a ratio by weight of about 40:10.

References Cited in the file of this patent

Frear: A Catalogue of Insecticides and Fungicides, vol. II, page 49 (1948).

Hanna: Handbook of Agricultural Chemicals, 2nd ed., (1958), pages 193, 199.